Patented June 13, 1950

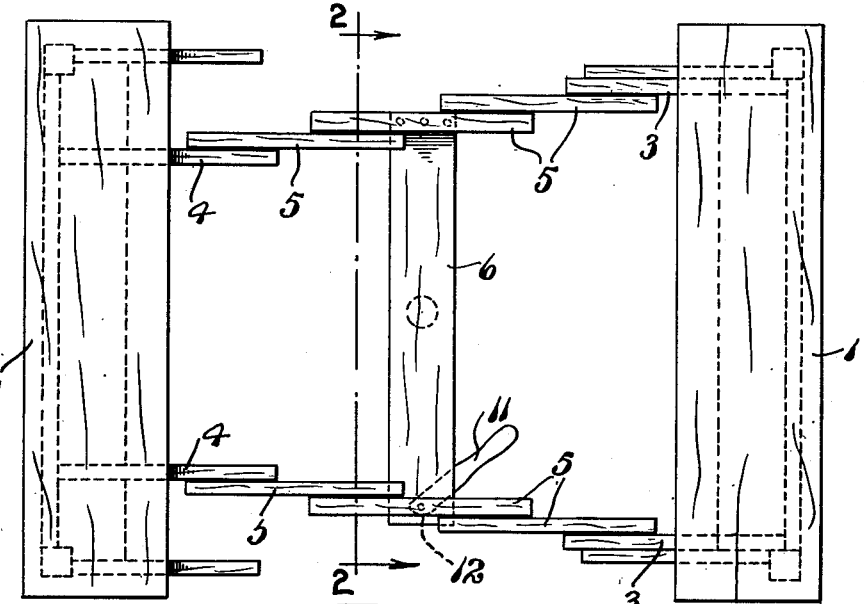
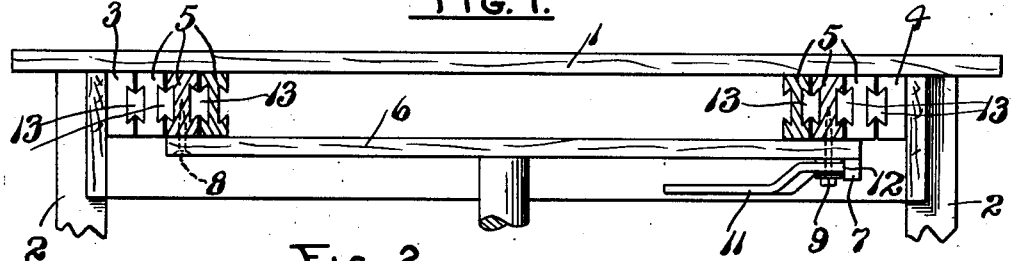
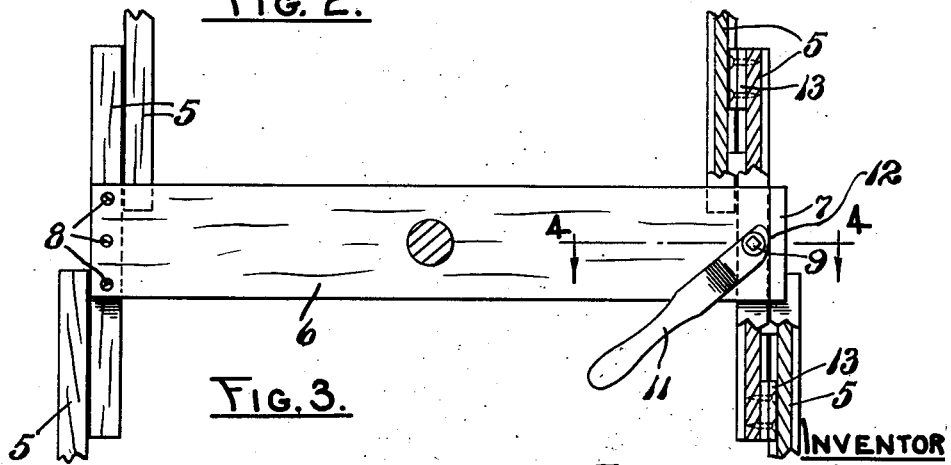

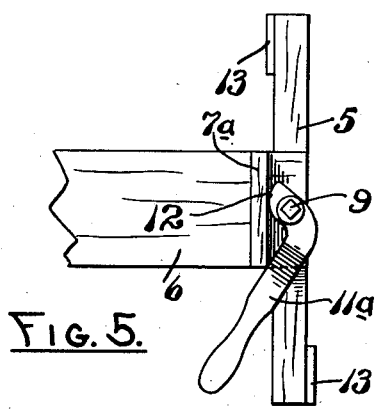
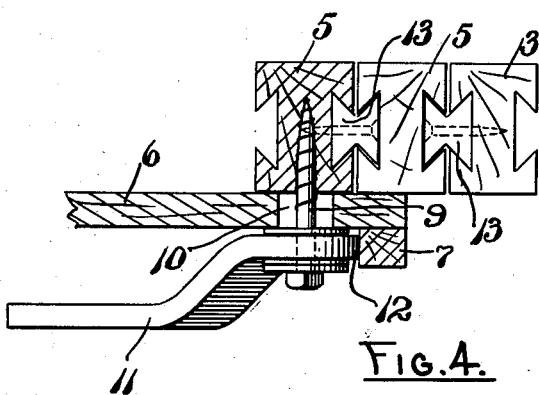
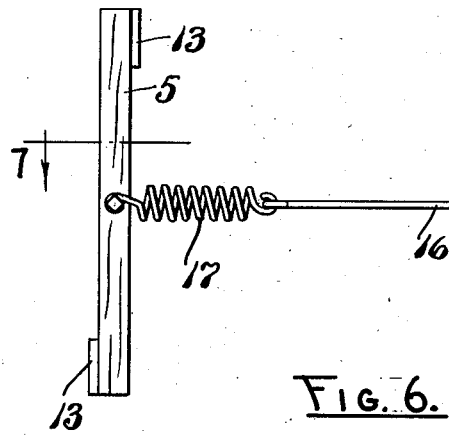
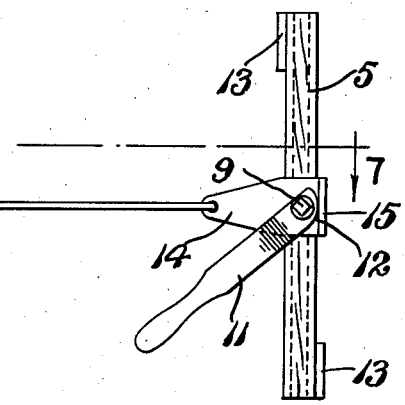
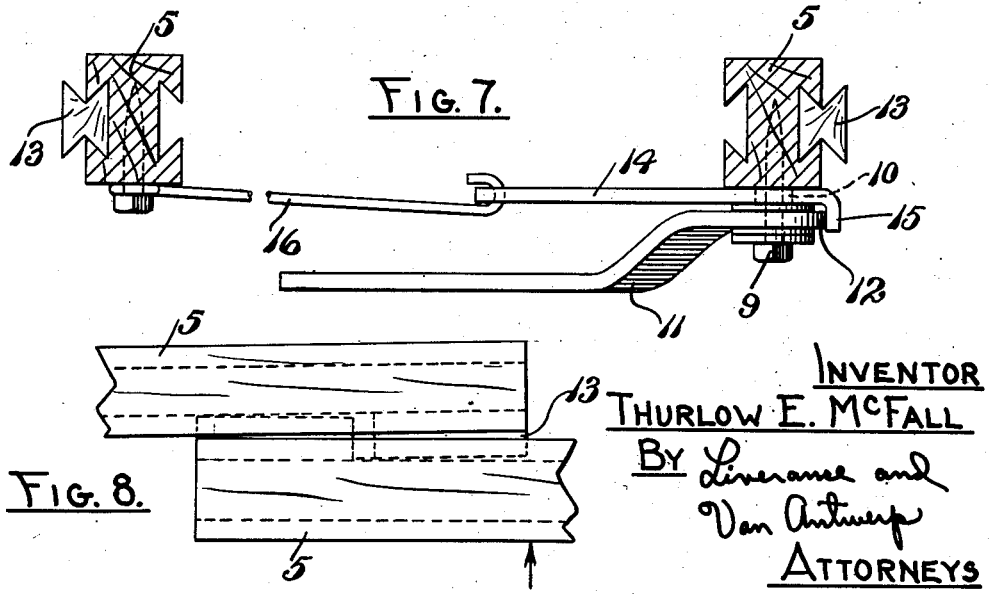

2,511,282

UNITED STATES PATENT OFFICE 2,511,282

LOCK MEANS FOR EXTENSION TABLE SLIDES

Thurlow E. McFall, Sparta, Mich., assignor to Michigan Artcraft Company, Sparta, Mich., a corporation of Michigan Application June 24, 1946, Serial No. 678,778

4 Claims. (Cl. 311—68)

This invention is concerned with extension tables and, particularly, the extension slides which are used therewith. The invention is directed to an improvement in connection with such extension slides which permits their free and easy operation at the times that the table is to be extended or retracted but which, particularly after an extension and the filling of the top space with filler leaves for enlarging the top of the extended table, the slides may be releasably held and bound securely against looseness of movement or sagging of the table top because of the required tolerances or spaces between the engaging parts of the slides, in order that such free sliding movement may be had under the most severe conditions of moisture enlargement by swelling of the slides; and which will also insure against so-called "chucking," both laterally and in a vertical direction when the table is extended and subjected to a pressure or weight thereagainst, particularly upon extended drop leaf tables, which causes the slides to be bowed upwardly by vertical displacement of the slides with respect to each other.

My invention relates to a very novel and simple, practical slide attachment, applicable to all kinds and types of extension slide tables, for securely holding the slides when extended against such chucking or other undesired movement, and which also has value as a releasable lock which prevents accidental elongation of the slides when in retracted position. Furthermore, the improvement which I have made is operable in any of the indefinite number of extended positions which the slides may take and at anyone of which it is desirable to secure them against either extension or retraction, or looseness of play between them.

An understanding of the invention may be had with the following description taken with the accompanying drawings, in which, Fig. 1 is a plan view showing my invention applied to an extension table.

Fig. 2 is a transverse vertical section, looking in the direction indicated, taken upon the plane of line 2—2 of Fig. 1.

Fig. 3 is a fragmentary under plan view with some parts in section, illustrating the attachment which extends between intermediate slides of the two spaced series of extensible slides which are commonly used with extension table.

Fig. 4 is a fragmentary enlarged vertical section upon the plane of line 4—4 of Fig. 3 looking in the direction indicated.

Fig. 5 is a fragmentary under plan view similar to Fig. 3 showing a different but equivalent form of the invention which secures the same results based upon the same principles of operation.

Fig. 6 is an under plan view, somewhat similar to Fig. 3, illustrating a specifically different form of the bridging structure extending between opposed intermediate slides of the two slide series.

Fig. 7 is an enlarged transverse vertical section, substantial of the structure shown in Fig. 6 on the plane of line 7—7 of said Fig. 6, looking in the direction indicated, and, Fig. 8 is a fragmentary plan of contiguous end portions of adjacent slides illustrating the play or looseness of connection of the slide members with respect to each other.

Like reference characters refer to like parts in the different figures of the drawings.

The table may be any conventional extension slide table, one form of which is shown in Fig. 1 as having two extensible top sections 1, with two sets of extension slides between them. Each of said sets of series of slides has its respective end slide members 3 and 4 permanently secured in connection with the supporting corner posts 2 and the normal box structure at the upper side of which the top sections 1 are secured. The intermediate slide members 5 and their slidable connection with each other and with the end slide members 3 and 4 follows long known and very universely used table slide structure, the detail of which need not be entered into specifically excepting for the hereinafter description of the slide tolerance which must be provided for the slides to freely extend and retract under different atmospheric conditions to which they are subjected.

With my invention, in the form of it shown in Figs. 1, 2 and 3, a transverse member 6, which may be a board, at one end and at its underside has a cross bar 7 permanently connected thereto (Fig. 2). The opposite end of the member 6 is permanently secured, for example, by screws 8 to the under side of an intermediate slide member 5. Adjacent the opposite end or where the bar 7 is connected, a headed screw 9 extends upwardly through a short longitudinal slot 10 (Fig. 4) in the member 6 and is driven into the opposite intermediate slide member 5 of the other set or series of slides. A hand operated lever 11 has the shank of the screw 9 passing therethrough near its outer end, and such outer end of the lever 11 is formed with a cam edge 12 which bears against the bar 7 so that on turning the lever in a clockwise direction, Figs. 3 and 6, or counterclockwise with reference to Fig. 1, the two spaced series of slides when extended are pulled or bowed inwardly toward each other.

In the construction of extension slides, the slide members are longitudinally grooved at both sides with a dove-tailed groove. Blocks 13 are secured in the groove of one slide member, being shaped to fit snugly therein (Fig. 4), and have a projection of similar form to be received on the longitudinal groove at the adjacent groove of the contiguous slide member. Such utilization of blocks of the shape described, and best shown in Fig. 4, has been long known in the construction of extension table slides.

Because of the swelling and shrinking of the materials from which slides are made under changing atmospheric conditions, the projecting portions upon which slide members freely move must be made smaller than the area of the grooves receiving them, and with a tolerance provided such that under the most severe conditions of moisture carrying air there will still be a freedom of movement notwithstanding the swelling of the materials when exposed to such air, and particularly when long exposed thereto. This results in relatively great looseness, for example, when the air is almost, if not quite, free of moisture therein. For tables which are manufactured can not be made for one locality or section only, but are distributed to many widely separated localities in which atmospheric conditions are of an indefinite variety including all variations between substantial saturation of the air with water vapor to air in which the water vapor is substantially absent. When the slides are shrunk, the looseness or play is materially increased, the slides may sag downwardly under the influence of gravity to take up the slack; and, for example, with a drop-leaf table with the drop leaf extended, a weight or force against the upper side of the horizontally positioned drop leaf will bow the slides upwardly between their ends.

With the present invention, with the lever 11 released, the slides are freely movable. The table may be extended to any desired length and filler leaves put in place and the top closed. Then by operating the lever 11 in the manner described, the two spaced series of slides are pulled or bowed inwardly toward each other with a displacement, for example, as shown in Fig. 8 to the extent which the tolerance or looseness of the dove-tailed blocks 13 with reference to their receiving grooves permit. And, when thus tightened, the slides are held in a substantially rigid condition and will not chuck upwardly or sag downwardly or otherwise accidentally change position.

In Fig. 5, instead of the bar 7 being at the end of the member 6, it is shown in the bar 7a, spaced inwardly a short distance therefrom, and the lever 11a is correspondingly changed in design to bring the cam edge 12 against the outer side of said bar 7a. This is a mere reverse of the structure shown in Figs. 1 to 4 inclusive, and performs the same offices in the same manner by directly equivalent structure.

In Figs. 6 and 7, the single member 6 extending between intermediate slide members of the two spaced series of slides is replaced by plate 14 of metal having a down turned lip 15 at its outer end and slotted with a slot, such as 10, for the screw 9 to pass through, such plate being of short length, and having a rod 16 connected to its inner end extending toward the opposite intermediate slide member 5 and connected therewith by a coiled tension spring 17. Such spring, when the lever 11 is released, will be sufficiently tensioned only to draw the slides lightly toward each other but not with such force as to develop a friction which interferes to any marked degree with the extension of retraction of the slides. But, when the lever 11 is turned to operate its cam 12 against the lip 5, the spring will be stretched, developing a heavier force which will secure the slides against accidental movement and eliminate the undesired looseness or play therein when the table is fully extended and the top completed by the usual filler leaf insertions. In Fig. 7 the same structure is shown with the variation only that the spring 17 is omitted, the rod 16 extending to the opposed intermediate slide member 5 and permanently connected therewith. The spring 17 when used may act as a continually operating force to take up any slack at any time occurring in conjunction with the table after it has been extended and the lever 11 operated.

It is also obvious that with the slides retracted and the two top sections 1 brought together, the structure described will operate substantially as a lock to hold said sections against any undesired limited accidental movement away from each other; and, further, as a lock the structure is operable at any and all positions of the slides between their fully retracted and their fully extended positions.

The invention described is one of great practical utility. The tolerances heretofore used in the slides may be increased to a positive assurance against the binding which now occurs with many extension slide tables when they have been long exposed to an atmosphere heavily laden with moisture. Chucking or bowing upwardly of the slides upon pressure applied to a lifted drop-leaf table, or any lateral movements, and other very undesirable movements are prevented from occurring. These will be obviated in the extended table by the very practical, simple, easily produced and easily applied structures described as embodiments of the invention.

The invention is defined in the appended claims and is to be considered comprehensive of all forms of structure coming within their scope.

I claim:

1. In a table structure, two spaced series of extension slides each comprising, a plurality of longitudinal slide members with interengaging means between successive slide members whereby the slides may be longitudinally extended or retracted, a flat member located against the under side of an intermediate slide member of one of the slide series, said flat member having a slot therein in a direction substantially at right angles to the length of the slide member, a vertical member extending upwardly through said slot into said intermediate slide member, means connecting said flat member permanently to a like intermediate slide member of the other slide series, manually operable means mounted on said vertical member, and cooperating means carried by said slotted flat member against which said manually operable means may be brought to bear to move said intermediate slide members toward each other whereby, with the end slide members of the slide series being held in relatively fixed relation to each other, each of said slide series when extended are frictionally bound to normally prevent movement of the slide members of both series of slides.

2. In an extensible table structure, two spaced series of extension slides each having end slide members and a plurality of intermediate slide members connected therewith and with each other for longitudinal extension or retraction, table end structures to which the end members of the slide series are permanently secured, like end members of the two series being located and maintained in fixed spaced relation to each other, a flat member located at the under side of an intermediate slide member of one of the series of slides, said flat member having a slot therein, the length of which is substantially at right angles to the direction of the slide extension, a headed member passing upwardly through said slot into said intermediate slide member, said slotted member having a transverse member connected therewith extending downwardly at its under side, a lever mounted on said pin between its ends provided at one end with a cam to bear against the transverse member on said slotted flat member, to move said intermediate slide member relative to the slotted member with which it is associated in an inward direction, and means permanently connecting the opposite end of said slotted member with the like intermediate slide member of the other series of slides.

3. A construction as defined in claim 2, said slotted flat member at its inner end having a rod secured thereto and extending to the opposite intermediate slide member and permanently secured thereto.

4. A construction as defined in claim 2, said slotted flat member having a rod secured at one end to the inner end thereof and extending toward the intermediate slide member of the other series of slides, and a coiled tension spring connected to the other end of said rod at one end and to the intermediate slide member of the other series of slides at its other end.

THURLOW E. McFALL.

REFERENCES CITED

The following references are of record in the file of this patent:

UNITED STATES PATENTS

| Number | Name | Date |
| --- | --- | --- |
| 283,582 | Devers | Aug. 21, 1883 |
| 620,447 | Hanson | Feb. 28, 1889 |
| 783,553 | Stutzman et al. | Feb. 28, 1905 |
| 1,033,844 | Tyden | July 30, 1912 |
| 1,396,864 | Mayne | Nov. 15, 1921 |
| 1,828,435 | Otte | Oct. 20, 1931 |
| 2,014,257 | LaFetra | Sept. 10, 1935 |